United States Patent Office 3,812,149
Patented May 21, 1974

3,812,149
PREPARATION OF 2-PYRROLIDINONE
Elmer J. Hollstein, Wilmington, Del., assignor to Sun Research and Development Co., Philadelphia, Pa.
No Drawing. Filed July 21, 1972, Ser. No. 274,120
Int. Cl. C07d 27/08
U.S. Cl. 260—326.5 FN                                   7 Claims

ABSTRACT OF THE DISCLOSURE

A process for preparing 2-pyrrolidinone which comprises reacting succinic acid or its precursor, hydrogen, and ammonia in an aqueous system at a mole ratio of ammonia to acid of about 1.1:1 to about 1.7:1, at a temperature of from about 250° C. to about 275° C., at a pressure of from about 1500 to 2000 p.s.i.g., for a time of about 3 to about 6 hours, and in the presence of a rhodium catalyst.

---

The conversion of anhydrides such as maleic anhydride and succinic anhydride to 2-pyrrolidinone is known in the art. For example, U.S. 3,080,377 (Liao, assigned to FMC Corp., issued Mar. 5, 1963) discloses that succinic anhydride may be converted to 2-pyrrolidinone by reaction for 1 to 8 hours with ammonia (1 to 20 moles per mole of anhydride, preferably 2 to 5 moles of liquid ammonia) and at least one mole of hydrogen at 200°–300° C., at 500 to 5000 p.s.i.g., and in the presence of catalysts such as cobalt, nickel, ruthenium, and palladium. Yields of 2-pyrrolidinone product are on the order of 50% (with ruthenium on carbon as catalyst) to 70% of theory (with Raney cobalt).

U.S. 3,198,808 (Himmele et al., assigned to BASF, issued Aug. 3, 1965) discloses preparation of 2-pyrrolidinone from maleic acid and ammonia using a specially prepared sintered oxide catalyst whereby high yields are obtained.

U.S. 3,109,005 (Lidov, assigned to Halcon International, Inc., issued Oct. 29, 1963) discloses preparation of 2-pyrrolidinone and its N-substituted derivatives from maleic anhydride in a solvent system by reaction of hydrogen and 5 moles of ammonia or suitable amine per mole of anhydride at 150° to 350° C., for 10 to 12 hours at 100 to 300 atmospheres and in the presence of a hydrogenation catalyst such as Raney nickel, Raney cobalt, or palladium or platinum on a support. Yields of product are given as about 65% to 76% theory.

In investigating the process of making 2-pyrrolidinone in an aqueous system it has been found that yields are generally poor being less than about 60% of theory. Furthermore, although many catalysts are suggested for the process, the reaction appears to be highly sensitive to catalyst metal. It has now been discovered that in the conversion of succinic acid or its precursor to 2-pyrrolidinone in an aqueous system, surprisingly high yields can be obtained by following the process of this invention.

In accord with the invention, 2-pyrrolidinone is prepared in high yield by reacting succinic acid or its precursor with ammonia in an aqueous system at a mole ratio of ammonia to acid of about 1.1:1 to about 1.7:1, at a temperature of from about 250° C. to about 275° C., at a pressure of from about 1500 to about 2000 p.s.i.g., for a time of about 3 to 6 hours, and in the presence of a rhodium catalyst.

The amount of ammonia used in the reaction to achieve the high yields capable of the process is an important parameter of the process. Maximum yield occurs when the above range of about 1.1 to about 1.7 moles of ammonia are used per mole of acid. It will be understood that other parameters will have an influence on the selection of a particular ratio to obtain a maximum yield. Thus, for example, with a rhodium on carbon catalyst, the preferred mole ratio of ammonia to acid will be on the order of 1.5:1, but with rhodium on alumina, the preferred ratio for maximum yield is on the order of 1.3:1. However, operation within the above range will generally give high yields of 2-pyrrolidinone product and rapid yield fall-off occurs when deviating from this ratio. The temperature of reaction is from about 250° C. to about 275° C., preferably about 250°–260° C. It has been found that suitable reaction times will require from about 3 to about 6 hours, preferably 4 to 6 hours to obtain maximum yield of product. In general, the most preferred conditions for maximum yield and efficient operation are a temperature of about 252° C., an ammonia to acid mole ratio of about 1.3:1 to about 1.5:1, a hydrogen pressure of about 1700 p.s.i.g. and reaction time of 4 to 6 hours.

As pointed out above, a precursor of succinic acid may be used in the process. Thus, for example, maleic acid, fumaric acid, maleic anhydride and the like may be employed which during the initial hydrogenation is converted in situ to succinic acid. It is important that such conversion occurs, because decomposition of the precursor may occur if the temperature is raised to reaction temperature so quickly that significant hydrogenation to succinic acid does not occur. Such decomposition will result in lower yields and also have an adverse effect on catalyst life. Succinic anhydride is also a useful precursor which will be hydrolyzed in the aqueous system to succinic acid.

As indicated, the process of the invention is also clearly dependent upon the use of a catalyst of rhodium, preferably on a support such as carbon or alumina. The support will contain from about 1% to 10% (preferably 5%) by weight rhodium in the total catalyst-support composition. The amount of catalyst composition used in the process may vary from about 1% to about 10% by weight of the maleic anhydride, and will preferably be used at 5% by weight. When using a carbon support for the catalyst the preferred temperature will be in the upper portion of the temperature range (e.g., about 275° C.) whereas a lower temperature (e.g., about 250° C.) is most effective for high yields when using alumina as support. Catalyst supports other than carbon or alumina may be used such as the numerous well-known catalyst supports exemplified by kaolin, zeolites (natural and synthetic), kieselguhr, and the like.

In order to illustrate the invention, the following examples are given.

EXAMPLE 1

A rocking one-liter stirred autoclave is charged with 98 g. of maleic anhydride, 5 g. of catalyst of 5% by weight rhodium on carbon, 343 ml. of water, and with an amount of 28% aqueous ammonium hydroxide to give an ammonia to maleic anhydride ratio of 1.5:1. The autoclave is closed and charged with hydrogen to 1600 p.s.i.g. pressure and is then heated to 100° C. for 15 minutes to saturate the double bond. The reaction mass is then heated to 275° C. at which point a pressure of 1700 p.s.i.g. is maintained. After holding on temperature for various times the reaction mass is cooled, the contents removed and are analyzed by nuclear magnetic resonance. The data obtained is shown in the following table.

| Time of reaction (min.): | Yield of 2-pyrrolidinone (mole percent) |
|---|---|
| 15 | 18 |
| 60 | 52 |
| 120 | 78 |
| 180 | 90 |
| 240 | 92 |

EXAMPLE 2

When Example 1 is repeated but with a mole ratio of ammonia to maleic anhydride of 0.8:1 the highest yield of 2-pyrrolidinone obtainable after 4 hours is about 58 mole percent.

EXAMPLE 3

When Example 1 is repeated but the maleic anhydride replaced with succinic acid and the reaction mass heated directly to 275° C. and maintained for 4 hours, the yield of 2-pyrrolidinone product is over 90 mole percent.

EXAMPLE 4

Following the details of Example 1, 252 g. of maleic anhydride, 350 g. of water, varying amounts of ammonia, and 10 g. of a catalyst of 5% by weight of rhodium on carbon is reacted at 275° C. and 1700 p.s.i.g. for 5 hours. The following table indicates the results obtained.

| Moles of ammonia per mole of maleic anhydride: | Mole percent yield of 2-pyrrolidinone |
|---|---|
| 0.8 | 60 |
| 1.3 | 85 |
| 1.5 | 90 |
| 1.7 | 88 |
| 1.9 | 63 |

It is clear from the above data that the mole ratio of ammonia to maleic anhydride is a significant parameter in obtaining high yield of product.

EXAMPLE 5

Example 4 is repeated except that the catalyst used is supported on alumina and the reaction temperature is 252° C. for 6 hours. The following table indicates the results obtained.

| Moles of ammonia per mole of maleic anhydride: | Mole percent yield of 2-pyrrolidinone |
|---|---|
| 1.3 | 95 |
| 1.5 | 92 |
| 1.7 | 90 |
| 1.9 | 45 |

EXAMPLE 6

When Example 4 is repeated at an ammonia to mole ratio of 1.5:1 for a reaction time of 6 hours, but using a catalyst of platinum on carbon, the maximum yield obtained is 25%, thus showing the high catalyst specificity for the reaction.

The invention claimed is:

1. A process for preparing 2-pyrrolidinone which comprises reacting succinic acid or its precursor selected from the group consisting of maleic acid, fumaric acid, maleic anhydride, and succinic anhydride, hydrogen and ammonia in an aqueous system at a mole ratio of ammonia to acid of from about 1.1:1 to about 1.7:1, at a temperature of from about 250° C. to about 275° C., at a pressure of from about 1500 to about 2000 p.s.i.g., for time of about 3 to about 6 hours, and in the presence of a supported rhodium catalyst.

2. The process of claim 1 where the temperature is about 275° C., pressure is about 1700 p.s.i.g., and the catalyst is supported on carbon.

3. The process of claim 1 where the temperature is about 250° C., pressure is about 1700 p.s.i.g., and the catalyst is supported on alumina.

4. The process of claim 1 where a succinic acid precursor is used.

5. The process of claim 4 where the precursor is maleic anhydride.

6. A process for preparing 2-pyrrolidinone which comprises reacting maleic anhydride, hydrogen, and ammonia in an aqueous system at a mole ratio of ammonia to maleic anhydride of from 1.3:1 to about 1.5:1, at a temperature of about 275° C., a hydrogen pressure of about 1700 p.s.i.g., a reaction time of from about 3 to about 6 hours, and a catalyst of rhodium supported on carbon where about 5% by weight of the catalyst-support composition is rhodium.

7. A process for preparing 2-pyrrolidinone which comprises reacting maleic anhydride, hydrogen, and ammonia in an aqueous system at a mole ratio of ammonia to maleic anhydride of from about 1.3:1 to about 1.7:1, at a temperature of about 250° C., a hydrogen pressure of about 1700 p.s.i.g., a reaction time of about 3 to about 6 hours, and a catalyst of rhodium supported on alumina where about 5% by weight of the catalyst-support composition is rhodium.

References Cited

UNITED STATES PATENTS 3,644,402   2/1972   Takagi et al. ____ 260—326.5 FN

JOSEPH A. NARCAVAGE, Primary Examiner